(12) United States Patent
Sasaki (10) Patent No.: US 7,180,841 B2
(45) Date of Patent: Feb. 20, 2007

(54) RECORDING METHOD, RECORDING MEDIUM, PROGRAM, INFORMATION RECORDING MEDIUM, AND INFORMATION RECORDING DEVICE

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 608 days.

(21) Appl. No.: 10/422,988

(22) Filed: Apr. 25, 2003

(65) Prior Publication Data

US 2003/0223338 A1    Dec. 4, 2003

(30) Foreign Application Priority Data

May 31, 2002   (JP) .............................. 2002-160422

(51) Int. Cl.
*G11B 7/00* (2006.01)
(52) U.S. Cl. ................... 369/53.21; 369/53.37
(58) Field of Classification Search ............. 369/53.21, 369/47.14, 59.25
See application file for complete search history.

(56) References Cited

U.S. PATENT DOCUMENTS

| 6,330,210 B1 * | 12/2001 | Weirauch et al. ........ 369/30.11 |
| 6,580,682 B1 * | 6/2003 | Kamperman et al. .... 369/275.3 |
| 2002/0024902 A1 | 2/2002 | Sasaki |

* cited by examiner

*Primary Examiner*—Wayne Young
*Assistant Examiner*—Lixi Chow
(74) *Attorney, Agent, or Firm*—Dickstein Shapiro (57) ABSTRACT

A recording method is provided that can protect information recorded on a recording medium in a designated recording format. In response to a request for recording in a designated recording format among a plurality of recording formats applicable to the recording medium, restriction information for restricting recording in one or more recording formats other than the designated recording format among the plurality of recording formats is recorded in a predetermined area on the recording medium. Even if there is a request for data recording in a recording format in which recording is restricted, the request for data recording is dismissed by this method. Thus, data already recorded in the designated recording format can be prevented from being overwritten by other data.

25 Claims, 8 Drawing Sheets

| PHYSICAL SECTOR | MAIN DATA BYTE LOCATION | DESCRIPTION | NUMBER OF BYTES |
|---|---|---|---|
| 0 | D0–D3 | CONTENT DESCRIPTOR | 4 |
| 0 | D4–D7 | UNKNOWN CONTENT DESCRIPTOR ACTIONS | 4 |
| 0 | D8–D39 | DRIVE ID | 32 |
| 0 | D40–D2047 | CONTENT DESCRIPTOR SPECIFICS | 2008 |
| 1–9 | D0–D2047 | FORMATTING BITMAP | 9 × 2048 |
| 10–15 | D0–D2047 | IDLE | 9 × 2048 |

RECORDING METHOD, RECORDING MEDIUM, PROGRAM, INFORMATION RECORDING MEDIUM, AND INFORMATION RECORDING DEVICE

BACKGROUND OF THE INVENTION

1. Field of the Invention

The present invention relates to a recording method, a recording medium, a program, an information recording medium, and an information recording device, and, more particularly, to a method of recording information on a recording medium, a recording medium on which recording is performed by the recording method, a program to be utilized in an information recording device, an information recording medium on which the program is recorded, and the information recording device that records information on the recording medium.

2. Description of the Related Art

As the performance of personal computers has rapidly improved, it has now become possible to handle audio/visual information in the form of music and images with personal computers. Since the amount of data contained in audio/visual information is very large, there has been an increasing demand for large-capacity optical disks, such as compact disks (CDs) and digital versatile disks (DVDs), as recording media. As the optical disks have become more reasonable in price, optical disk devices that serve as drive devices to access optical disks are now widely used as part of the peripheral equipment for personal computers.

Also, as a wider variety of information is now being handled with personal computers, more and more types of optical disk have been developed. For example, CD-type optical disks include CD-RBM disks, CD-R (CD-Recordable) disks, and CD-RW (CD-Rewritable) disks. DVD-type optical disks include DVD-ROM disks, DVD-RAM disks, DVD-R (DVD-Recordable) disks, DVD-RW (DVD-Rewritable) disks, DVD+R (DVD+Recordable) disks, and DVD+RW (DVD+Rewritable) disks. Data recording and reproduction are performed on each of the optical disks in compliance with each corresponding predetermined standard.

In response to a public demand for improvement in operability of now widely-used optical disks, the Mt. Rainier standard was suggested, and the CD-MRW standard has been known as the Mt. Rainier-compliant CD-RW standard. In accordance with the Mt. Rainier standard, a file is dragged and dropped onto an optical disk device displayed as an icon on the display of a personal computer, so that recording on an optical disk can be immediately started. The Mt. Rainier standard further provides a function of controlling information as to defective areas and the corresponding spare areas on the optical disk (the information will be hereinafter referred to as the "defect control information"). If a designated data recording area includes a defective area, the data are automatically recorded in a spare area corresponding to the defective area.

DVD+RW disks have been developed as rewritable optical disks like CD-RW disks. Developing DVD+RW disks that are compatible with the Mt. Rainier standard is being considered with the purpose of achieving higher operability and providing a defect control function.

The Mt. Rainier standard is characterized in that a defect control area in which the defect control information is recorded and a spare area are both located in the data area. With this structure, even if an optical disk compatible with the Mt. Rainier standard (hereinafter referred to as the "compatible disk", for ease of explanation) is set to a drive device that does not support the Mt. Rainier standard (hereinafter referred to as the "conventional drive device"), a special-purpose driver is incorporated into a host apparatus such as a personal computer, so that access can be made to the defect control area and the spare area. With this structure, user data can be recorded in an area that is not a defective area.

However, in a case where the host apparatus does not have the special-purpose driver, an optical disk set to the conventional drive device is invariably regarded as incompatible with the Mt. Rainier standard, even if the optical disk is actually compatible with the Mt. Rainier standard. When user data are recorded on the compatible disk with the conventional drive device, the recording is performed without regard to the defect control information. If user data are recorded in a defective area, a problem of inconsistency arises between the contents of the defect control information and the actual defects. Also, with a rewritable optical disk, there is a possibility of user data overwrite in the defect control-information area.

SUMMARY OF THE INVENTION

A general object of the present invention is to provide a recording method, a recording medium, a program, an information recording medium, and an information recording device, in which the above disadvantages are eliminated.

A more specific object of the present invention is to provide a recording method and a recording medium that can protect information recorded on a recording medium in a designated recording format.

Another specific object of the present invention is to provide a program that is to be executed by a computer for controlling an information recording device and serves to protect information recorded in a recording medium in a designated recording format, and an information recording medium on which the program is recorded.

Yet another specific object of the present invention is to provide an information recording device that can protect information recorded on a recording medium in a designated recording format.

The above objects of the present invention are achieved by a method of recording information on a recording medium. This method includes the step of recording restriction information for restricting recording in one or more recording formats other than a designated recording format among a plurality of recording formats applicable to the recording medium, in response to a request for recording in the designated recording format among the plurality of recording formats. The restriction information is recorded in a predetermined area on the recording medium.

By this method, in response to a request for recording in a designated recording format among a plurality of recording formats that are applicable to a recording medium, restriction information for restricting recording in one or more recording formats other than the designated format among the plurality of recording formats is recorded in a predetermined area on the recording medium. Even if there is a request for data recording in a recording format in which recording is restricted, the request for data recording is dismissed, and thereby, data already recorded in the designated recording format can be prevented from being overwritten by other data. Thus, information recorded on the recording medium in the designated recording format can be protected.

In this method, the designated recording format may be a recording format that is compatible with the one or more recording formats in which recording is restricted.

Also, in this method, the designated recording format may be a recording format formed by adding a function of controlling information as to defects in the recording medium to one of the recording formats in which recording is restricted. In this manner, the information as to defects in the recording medium can be prevented from being overwritten by user data, for example.

Further, in the above method of the present invention, the designated recording format may be a recording format compliant with the DVD+RW Mt. Rainier standard, and the one or more recording formats in which recording is restricted may include a recording format compliant with the DVD+RW standard.

In this method, the predetermined area may be an area of a formatting disk control block.

Further, in this method, the formatting disk control block may include a content descriptor and unknown content descriptor actions, and the step of recording the restriction information may include: recording ID information in the content descriptor; and recording information for restricting data recording in the unknown content descriptor actions. In this case, the ID information is not the ID information indicating the formatting disk control block.

In this method, the information for restricting data, recording may be information for entirely prohibiting data recording. Alternatively, the information for restricting data recording may be information for prohibiting any data recording operations other than a formatting operation.

Further, this method may further include the step of recording formatting information that indicates completion of formatting, regardless of how much progress has been made in the formatting. In this case, the step of recording the formatting information is carried out after the step of recording the restriction information. Even if there is a request for formatting in a recording format in which recording is restricted, the request is dismissed, and thereby, data recorded in the designated recording format can be prevented from being overwritten by dummy data, for example.

Further, in this method, the step of recording the formatting information may include recording the formatting information in an area of a formatting disk control block on the recording medium.

The objects of the present invention are also achieved by a recording medium on which the restriction information is recorded by the above recording method.

Since the restriction information is recorded on the recording medium by the above recording method, information recorded on the recording medium in the designated recording format can be protected.

The objects of the present invention are also achieved by a program that is utilized in an information recording device that records information on a recording medium. This program is executed by a computer for controlling the information recording device, and the computer carries out the step of recording restriction information for restricting recording in one or more recording formats other than a designated recording format among a plurality of recording formats that are applicable to the recording medium, in response to a request from the outside. Here, the restriction information is recorded in a predetermined area on the recording medium.

By this method, in response to a request from the outside, restriction information for restricting recording in one or more recording formats other than a designated recording format among a plurality of recording formats applicable to a recording medium is recorded in a predetermined area on the recording medium. Even if there is a request for data recording in a recording format in which recording is restricted, the request for data recording is dismissed, and thereby, data already recorded in the designated recording format can be prevented from being overwritten by other data. Thus, information recorded on the recording medium in the designated recording format can be protected.

With this program, the computer for controlling the information recording device carries out the step of recording completion information that indicates completion of formatting, regardless of how much progress has been made in the formatting. In this case, the step of recording the completion information is carried out after the step of recording the restriction information. With this program, even if there is a request for formatting in a recording format in which recording is restricted, the request is dismissed, and thereby, data already recorded in the designated recording format can be prevented from being overwritten by dummy data, for example.

In this program, the designated recording format may be a recording format compliant with the DVD+RW Mt. Rainier standard. With this program, information as to defects in the recording medium can be prevented from being overwritten by user data, for example.

In this program, the predetermined area may be an area of a formatting disk control block.

Further, in this program, the formatting disk control block may include a content descriptor and unknown content descriptor actions, and the step of recording the restriction information may include: recording ID information in the content descriptor, and recording information for restricting data recording in the unknown content descriptor actions. In this case, the ID information is not the ID information indicating the formatting disk control block.

In this program, the information for restricting data recording may be information for entirely prohibiting data recording. Alternatively, the information for restricting data recording may be information for prohibiting any data recording operations other than a formatting operation.

The objects of the present invention are also achieved by a computer-readable information recording medium on which the above program is recorded.

Since the above program is recorded on this information recording medium, information recorded in the designated recording format can be protected by a computer executing the program.

The objects of the present invention are also achieved by an information recording device that records information on a recording medium. This information recording device includes: a communication controller that controls communication with an external device; and a restriction information recorder that records restriction information for restricting recording in one or more recording formats other than a designated recording format among a plurality of recording formats applicable to the recording medium, in response to a request for formatting in the designated recording format from the external device via the communication controller. Here, the restriction information is recorded in a predetermined area on the recording medium.

With this information recording device, in response to a request for formatting in a designated recording format from an external device, the restriction information recorder records restriction information for restricting recording in one or more recording formats other than the designated recording format among a plurality of recording formats, and the restriction information is recorded in a predetermined area on the recording medium. Even if there is a request for data recording in a recording format in which recording is restricted, the request for data recording is dismissed, and thereby, data already recorded in the designated recording format can be prevented from being overwritten by other data. Thus, information recorded on the recording medium in the designated recording format can be protected.

This information recording device may further include a completion information recorder that records completion information indicating completion of formatting, regardless of how much progress has been made in the formatting. Here, the completion information is recorded after the recording of the restriction information by the restriction information recorder is completed. With this information recording device, even if there is a request for formatting in a recording format in which recording is restricted, the request is dismissed, and thereby, data already recorded in the designated recording format can be prevented from being overwritten by dummy data, for example.

In this information recording device, the designated recording format may be a recording format compatible with the one or more recording formats in which recording is restricted.

Further, in this information recording device, the designated recording format may be a recording format formed by adding a function of controlling information as to defects in the recording medium to one of the recording formats in which recording is restricted. With this information recording device, the information as to defects in the recording medium can be prevented from being overwritten by other data.

In this information recording device, the designated recording format may be compliant with the DVD+RW Mt. Rainier standard, and the one or more recording formats in which recording is restricted may include a recording format compliant with the DVD+RW standard.

Further, in this information recording device, the predetermined area may be an area of a formatting disk control block.

In this information recording device, the formatting disk control block may include a content descriptor and unknown content descriptor actions, and the restriction information recorder records ID information in the content descriptor and also records information for restricting data recording in the unknown content descriptor actions. Here, the ID information is not the ID information indicating the formatting disk control block.

Further, in this information recording device, the information for restricting data recording may be information for entirely prohibiting data recording. Alternatively, the information for restricting data recording may be information for prohibiting any data recording operations other than a formatting operation.

The above and other objects, features, and advantages of the present invention will become more apparent from the following detailed description taken in conjunction with the accompanying drawings.

DESCRIPTION OF THE PREFERRED EMBODIMENTS

The following is a description of embodiments of the present invention, with reference to the accompanying drawings.

Figure 1:
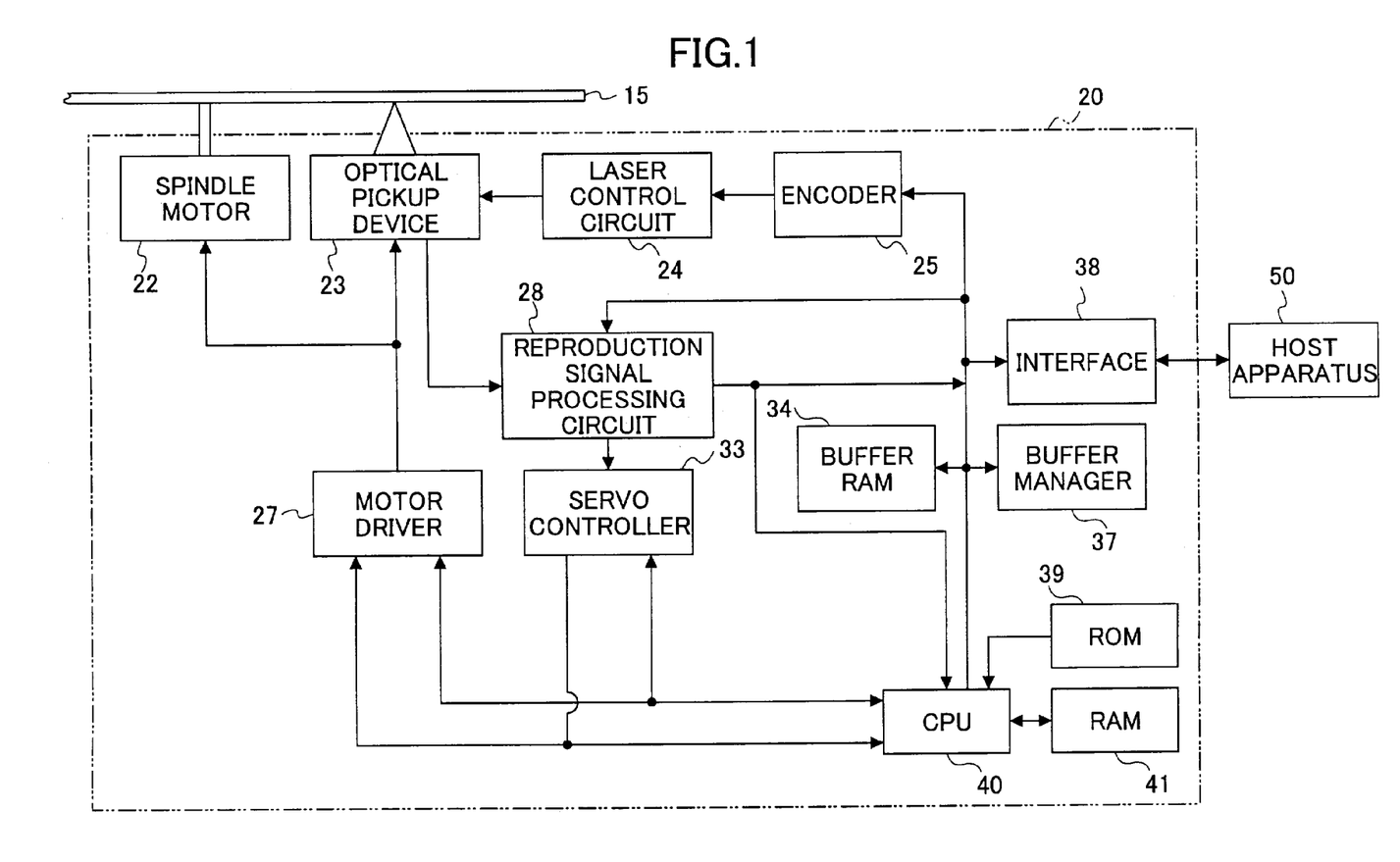
FIG. 1 is a block diagram illustrating the structure of an optical disk device in accordance with the present invention.

FIG. 1 schematically illustrates the structure of an optical disk device in accordance with the present invention.

An optical disk device 20 shown in FIG. 1 includes a spindle motor 22 that rotatably drives an optical disk 15 as a recording medium, an optical pickup device 23, a laser control circuit 24, an encoder 25, a motor driver 27, a reproduction signal processing circuit 28, a servo controller 33, a buffer RAM 34, a buffer manager 37, an interface 38, a ROM 39 that serves as an information recording medium, a CPU 40, and a RAM 41. The arrows shown in FIG. 1 only indicate the typical flow of signals and information, and do not represent all the connections among the blocks.

In this embodiment, a recording medium that is compatible with the DVD+RW Mt. Rainier standard (hereinafter referred to as the "DVD+MRW" standard) is used as the optical disk 15. The optical disk device 20 supports the DVD+MRW standard.

The optical pickup device 23 includes a semiconductor laser as a light source, an optical system that guides light flux emitted from the semiconductor laser to the recording surface of the optical disk 15 and also guides return light flux reflected by the recording surface to a predetermined light receiving position, a light receiver that is located in the predetermined light receiving position and receives the return light flux, and a drive system (a focusing actuator, a tracking actuator, and a seek motor), though these components are not shown in FIG. 1. The light receiver outputs a signal corresponding to the received light to the reproduction signal processing circuit 28.

The reproduction signal processing circuit 28 detects signals such as a wobble signal, an RF signal, and servo signals (a focusing error signal and a tracking error signal) based on the signal output from the light receiver. The reproduction signal processing circuit 28 then extracts ADIP (Address In Pre-groove) information and a synchronization signal from the wobble signal. The extracted ADIP information is then output to the CPU 40, and the extracted synchronization signal is output to the encoder 25. Further, after performing error correction on the RF signal, the reproduction signal processing circuit 28 stores the corrected signal in the buffer RAM 34 through the buffer manager 37. The servo signals are output from the reproduction signal processing circuit 28 to the servo controller 33.

Based on the servo signals, the servo controller 33 generates a control signal for controlling the optical pickup device 23, and outputs the control signal to the motor driver 27.

The buffer manager 37 manages data input to and output from the buffer RAM 34. When the amount of accumulated data reaches a predetermined level, the buffer manager notifies the CPU 40.

The motor driver 27 controls the optical pickup, device 23 and the spindle motor 22 in accordance with the control signal from the servo controller 33 and an instruction from the CPU 40.

The encoder 25 retrieves the data accumulated in the buffer RAM 34 through the buffer manager 37, in accordance with an instruction from the CPU 40. The encoder 25 then produces write data to be written on the optical disk 15 by performing processes such as adding an error correction code.

In accordance with an instruction from the CPU 40, the encoder 25 outputs the write data to the laser control circuit 24 in synchronization with a synchronization signal from the reproduction signal processing circuit 28.

The laser control circuit 24 controls laser beam output from the optical pickup device 23 in accordance with the write data sent from the encoder 25 and an instruction from the CPU 40.

The interface 38 that is a bi-directional communication interface communicates bi-directionally with a host apparatus 50 such as a personal computer, and is compliant with the interface standards such as the ATAPI (AT Attachment Packet Interface) standard and the SCSI (Small Computer System Interface) standard.

Programs are stored in the ROM 39, including a program of recording restriction information for restricting recording in a recording format compliant with the later-mentioned DVD+RW standard that utilizes codes readable by the CPU 40 (the program will be hereinafter referred to as the "restriction information recording program").

The CPU 40 controls operations of the above components in accordance with the programs stored in the ROM 39, and temporarily stores data necessary for the control operation in the RAM 41. When the optical disk device 20 is switched on, the programs stored in the ROM 39 are loaded into the main memory (not shown) of the CPU 40.

Figure 2:
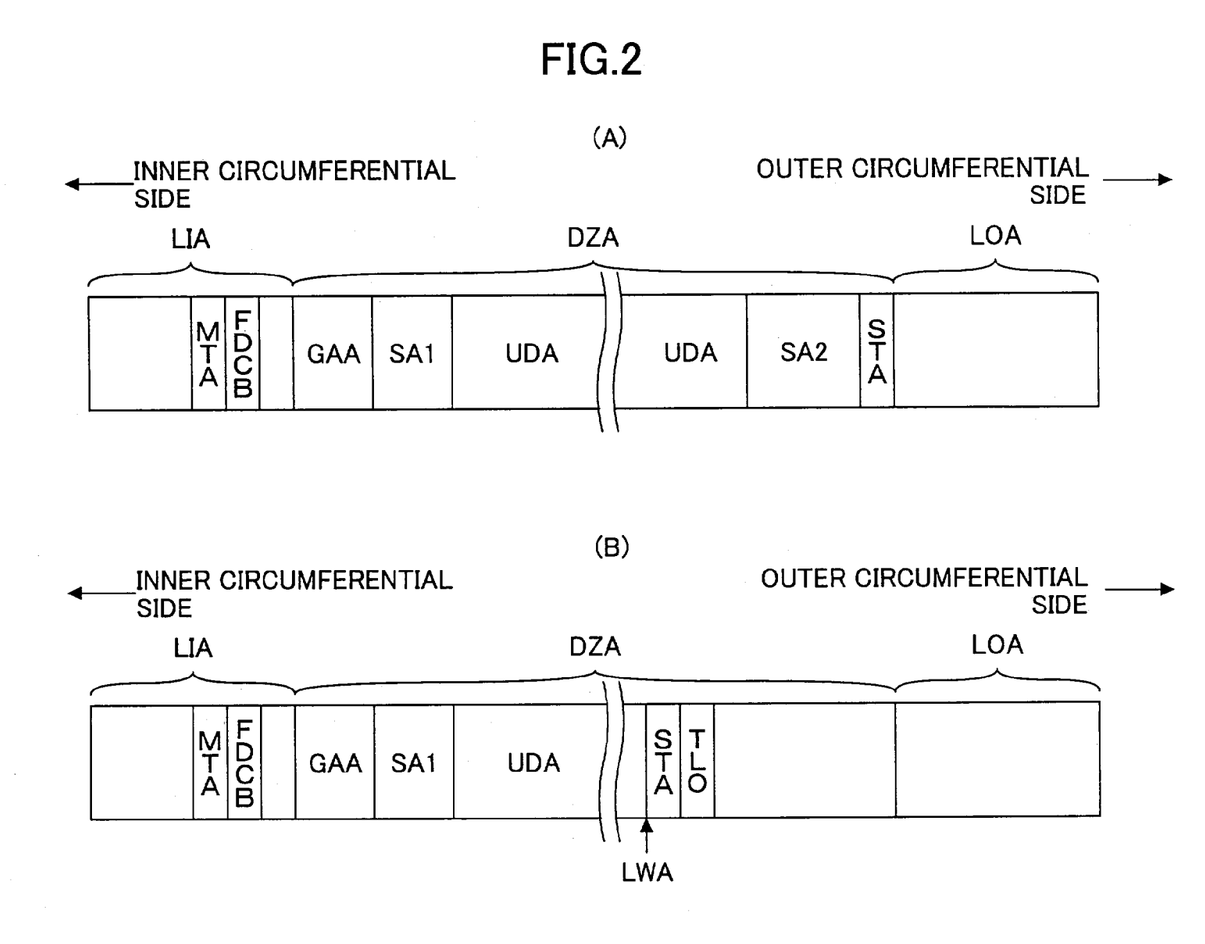
FIGS. 2A and 2B illustrate the structures of DVD+MRW recording areas.

The recording area on the optical disk 15 that is compliant with the DVD+MRW standard may be divided into three areas: a lead-in area LIA on the inner circumferential side, a data area DZA in the middle, and a lead-out area LOA on the outer circumferential side, as shown as an example in FIG. 2A. Although the actual tracks on the optical disk 15 are spiral, FIGS. 2A and 2B show the tracks in linear forms, for ease of explanation. In FIGS. 2A and 2B, the left side of each drawing is the inner circumferential side of the optical disk 15, while the ride side is the outer circumferential side of the optical disk 15.

The lead-in area LIA includes a main table area (hereinafter referred to simply as the "MTA") in which formatting information, defect control information, and the like are recorded.

Figure 3:
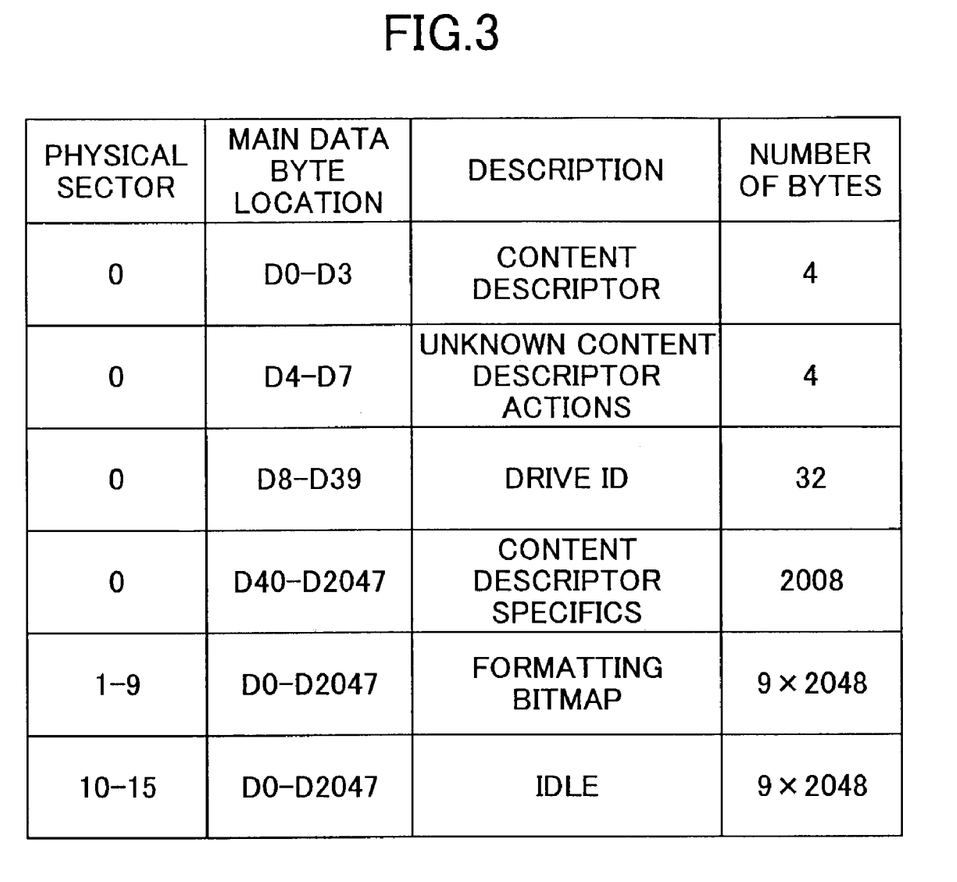
FIG. 3 illustrates the-data structure of a FDCB.

The lead-in area LIA also includes a formatting disk control block (hereinafter referred to simply as the "FDCB") that is made up of 16 sectors in which the formatting information is recorded. In the first sector of the FDCB, data including a 4-byte content descriptor, 4-byte unknown content descriptor actions (hereinafter referred to simply as the "UCDA"), a 32-byte drive ID, and 2008-byte content descriptor specifics, are recorded as shown in FIG. 3. The next nine sectors form a formatting bitmap area in which the recording status of each physical sector is recorded. The remaining six sectors are an idle area, and "0" is recorded in all the six sectors.

In the content descriptor, ID information that specifies the information recorded in the content descriptor specifics area is recorded in the form of ASCII codes. In the UCDA, restriction information including information as to process items to be restricted in a case where the drive device does not support the ID information in the content descriptor is recorded in bitmap form. The restriction information includes restriction information as to recording in the data area, restriction information as to notifications of block data information to users, restriction information as to formatting, and restriction information as to changes to the contents of the block data, each of which information item is represented by a corresponding one bit. In accordance with the DVD+MRW standard, the bit 0 represents the restriction information as to recording in the data area, the bit 1 represents the restriction information as to notifications of the block data information to users, the bit 2 represents the restriction information as to formatting, and the bit 3 represents the restriction information as to changes to the contents of the block data. If a bit is "1", the corresponding process is prohibited. The bits 4 through 31 in the UCDA are idle bits.

In the drive ID, information for specifying the drive device used for the recording in the FDCB is recorded. In the content descriptor specifics, information as to formatting conditions (hereinafter referred to as the "formatting condition information", for ease of explanation) is recorded as well as other information. In accordance with the DVD+RW standard, the formatting condition information is recorded in the bit 7 and the bit 6 in the byte 44 (D44). If the bit 7 and the bit 6 are both "0", formatting has not been performed yet. If the bit 7 is "0" and the bit 6 is "1", formatting is in progress. If the bit 7 is "1" and the bit 6 is "0", formatting has been completed. As far as the FDCB is concerned, the DVD+MRW standard is substantially the same as the DVD+RW standard.

The data area DZA includes not only a user data area UDA in which user data are to be recorded, but also a general application area (hereinafter referred to simply as the "GAA"), a spare area 1 (hereinafter referred to simply as the "SA1"), a spare area 2 (hereinafter referred to simply as the "SA2"), and a secondary table area (hereinafter referred to simply as the "STA"). In the GAA, information indicating the optical disk 15 is compliant with the Mt. Rainier standard is recorded. When the optical disk 15 is set to a conventional drive device, the GAA is read by a special-purpose driver (hereinafter referred to as the "MRW driver"), and used for indicating that the optical disk 15 is compliant with the Mt. Rainier standard. The recording of information in the GAA is performed in accordance with an instruction from the host apparatus 50. The SA1 and SA2 are spare areas for defective areas in the user data area UDA. In the STA, the same contents as those of the MTA are recorded.

Figure 4:
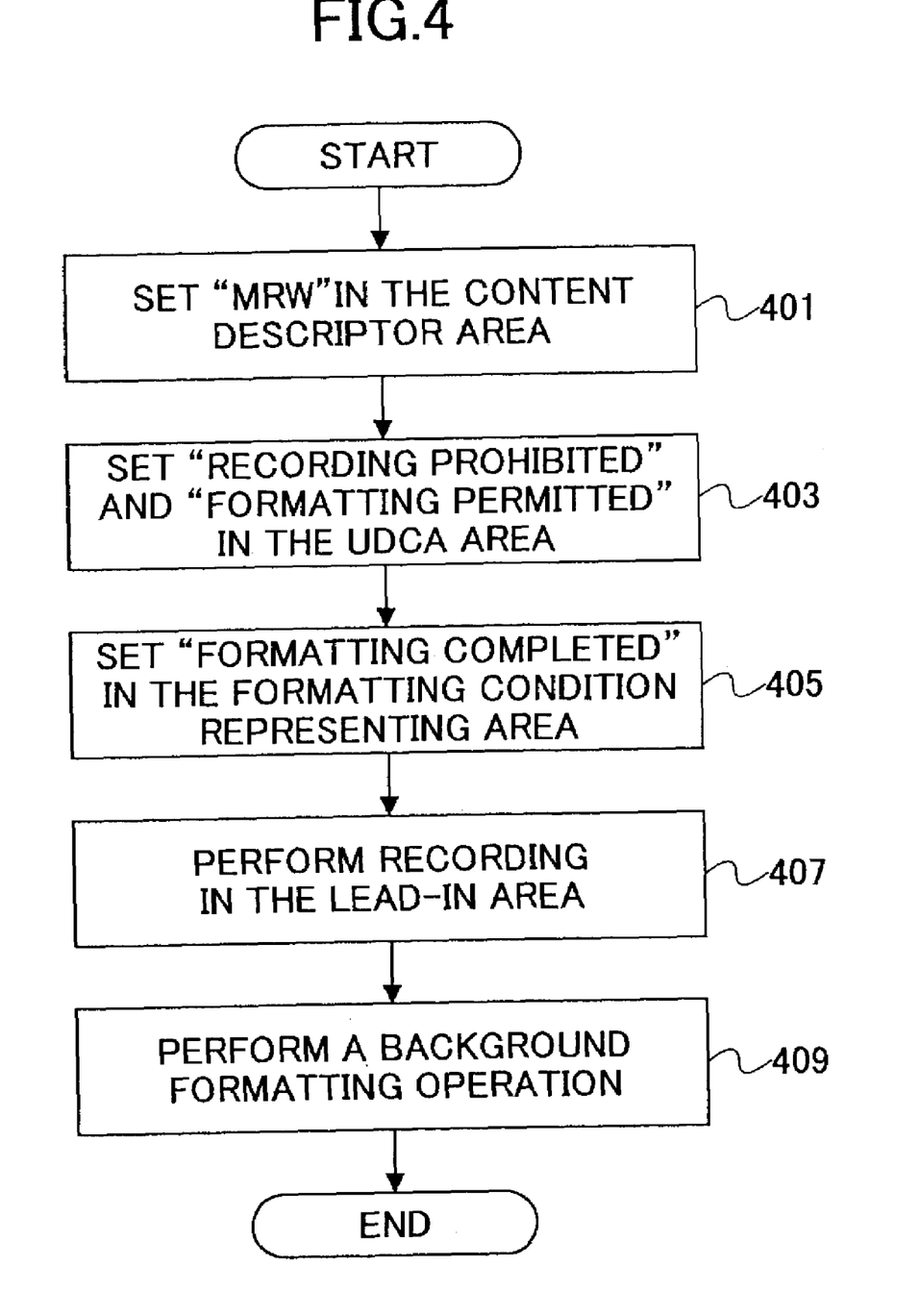
FIG. 4 is a flowchart of a control information recording operation in accordance with the present invention.
Figure 5:
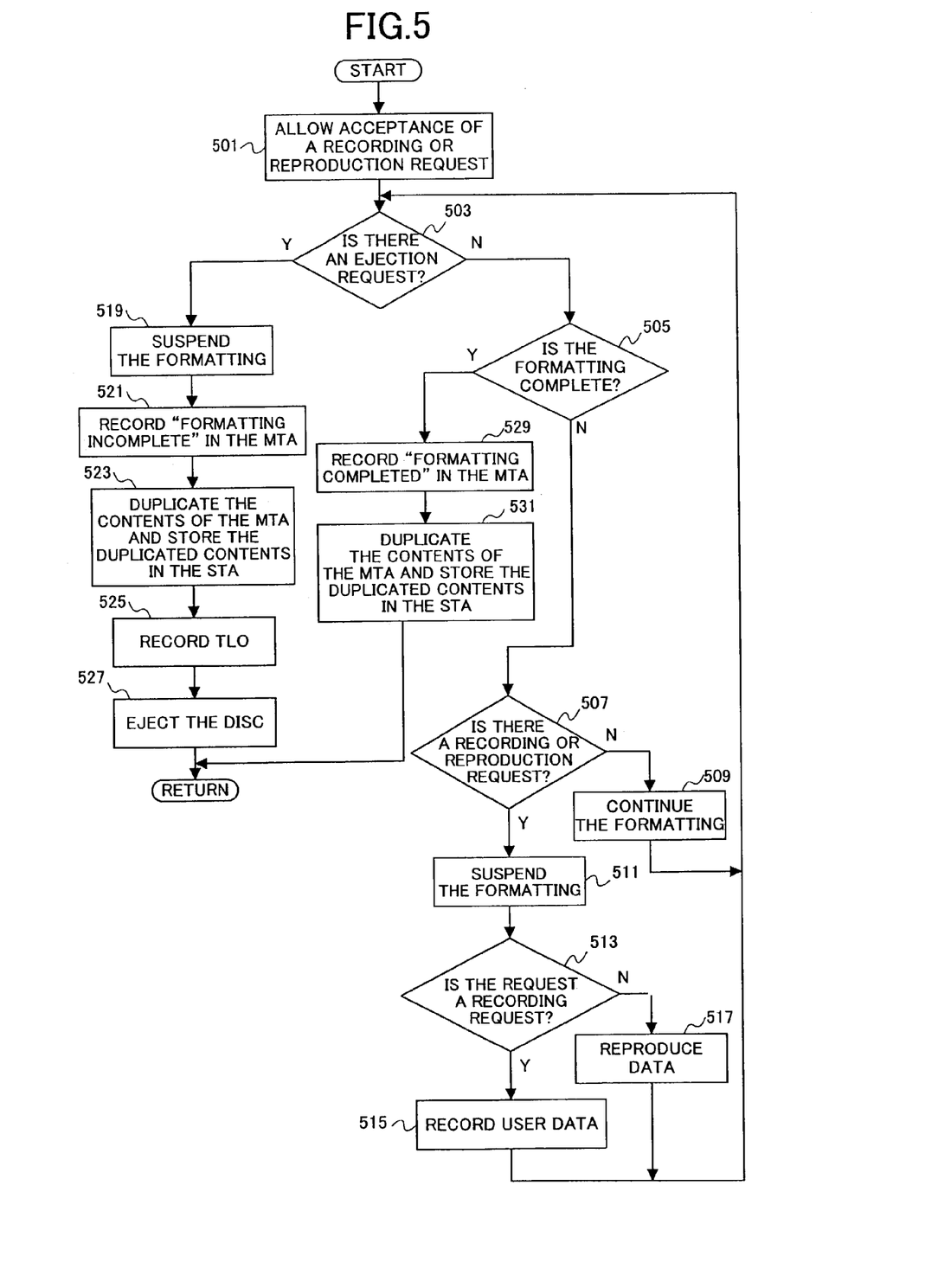
FIG. 5 is a flowchart of a background formatting operation in compliance with the DVD+MRW standard.

Referring now to FIGS. 4 and 5, an operation performed when the optical disk device 20 receives a command from the host apparatus 50 requesting a formatting operation in compliance with the DVD+MRW standard will be described. Hereinafter, the command will be referred to as the "MRW formatting command", and the operation as the "MRW formatting operation", for ease of explanation. The flowcharts of FIGS. 4 and 5 show a series of processing algorithms performed by the CPU 40. When the CPU 40 receives the MRW formatting command directed to a blank disk from the host apparatus 50, the first address of the program corresponding to the flowchart of FIG. 4 is set in the program counter of the CPU 40, and thereby the MRW formatting operation starts. Here, the blank disk is the optical disk 15, and communication with the host apparatus 50 is performed through the interrupt method.

In step 401, each flag to be used in the MRW formatting operation is initialized and set at "0", and an area corresponding to the data structure of the FDCB (hereinafter referred to as the "RAM data area", for ease of explanation) is secured on the RAM 41. The ACSII codes of "MRW" are then set as the ID information in a part of the RAM data area corresponding to the content descriptor of the FDCB. Here, the ID information is allotted with a version number, such as "00H" (H indicating that the number is hexadecimal), for example.

In step 403, "data recording prohibited" and "formatting permitted" are set as the restriction information in a part of the RAM data area corresponding to the UDCA of the FDCB. Here, the bit 0 is set to "1", and the bit 2 is set to "0". The bit 1 is set to "0", and the bit 3 remains at the default value, which is "1".

In step 405, "formatting completed" is set as the formatting condition information in a part of the RAM data area corresponding to the content descriptor specifics of the FDCB. Here, "1" is set in the bit 7 of the byte 44 (D44), and "0",is set in the bit 6 of the byte 44 (D44).

In step 407, the data recorded-in the RAM data area is recorded in the FDCB area on the optical disk 15. The rest of the information is also recorded in the lead-in area LIA. The block data recorded in the FDCB area do not have the content descriptor indicating "FDC", and therefore the FDCB area no longer serves as the FDCB.

In step 409, the operation moves onto the first step of the subroutine for performing a background formatting operation shown in the flowchart of FIG. 5.

In step 501, a notification that recording and reproduction requests are now acceptable is sent to the host apparatus 50.

In step 503, it is determined whether there is a request for ejection of the optical disk 15. If there is such a request from the host apparatus 50, "1" is set to the ejection request flag through an interrupt. If the ejection request flag is not "1", it is determined in-step 503 that there are no requests for ejection, and the operation moves on to step 505.

In step 505, it is determined whether the formatting has been completed. This determination depends on whether an idle area exists in the user data area UDA. If there is an idle area, the formatting is determined to be incomplete. Since the optical disk 15 is a blank disk, it is determined in step 505 that the formatting is incomplete, and the operation moves on to step 507.

In step 507, it is determined whether there is a recording request or a reproduction request from the host apparatus 50. If a recording requesting command (a write command) or a reproduction requesting command (a read command) is received from the host apparatus 50, "1" is set in the reception flag through an interrupt. If the reception flag is not "1", it is determined in step 507 that there are neither recording requests nor reproduction requests from the host apparatus 50, and the operation moves on to step 509.

In step 509, the formatting is carried out. More specifically, 16 sectors of dummy data, for example, are recorded in the idle area of the user data area UDA. The operation then returns to step 503.

Thereafter, the procedures of steps 503 through 509 are repeated until one of the results of the determinations of step 503, 505, and 507 indicates "YES". In this manner, the formatting proceeds.

If the reception flag is "1", it is determined in step 507 that there is a recording request or a reproduction request from the host apparatus 50. The reception flag is then reset to "0", and the operation moves on to step 511.

In step 511, the formatting is temporarily suspended.

In step 513, the received command is analyzed to determine whether the request from the host apparatus 50 is a recording request or a reproduction request. If the request from the host apparatus 50 is a recording request, the operation moves on to step 515.

In step 515, user data received from the host apparatus 50 are recorded in a designated area in the user data area UDA. The recording performed by the optical disk device 20 will be described later in detail. After the recording of the user data is completed, the operation returns to step 503.

If it is determined in step 513 that the request from the host apparatus 50 is a reproduction request; the operation moves on to step 517.

In step 517, the user data recorded in an area designated by the host apparatus 50 are reproduced and transferred to the host apparatus 50. The reproduction performed by the optical disk device 20 will be described later in detail. After the reproduction of the user data designated by the host apparatus 50 is completed, the operation returns to step 503.

Meanwhile, if the ejection request flag is "1" in step 503, it is determined that there is an ejection request from the host apparatus 50. After the ejection request flag is reset to "0", the operation moves on to step 519.

In step 519, the formatting is temporarily suspended.

In step 521, the formatting condition information and the like are recorded in the MTA. Here, "formatting incomplete" is recorded as the formatting condition information. Accordingly, information different from the formatting condition information recorded in the FDCB is recorded in the MTA. Also, information as to the recording condition of each sector is recorded in the MTA.

In step 523, the contents of the MTA are duplicated, and the duplicated contents are stored in the STA. Since the formatting is incomplete at this point, the recording of the STA starts from the address that follows the last address in the data recorded on the outermost circumference of the dummy data and the user data (i.e., the last written address, which will be hereinafter referred to as the "LWA"), as shown in FIG. 2B.

In step 525, temporary lead-out (hereinafter referred to as the "TLO") data are recorded after the recording of the STA. If an idle area exists on the inner circumferential side of the TLO area in the user data area UDA, the dummy data are recorded in the idle area. Accordingly, compatibility with DVD-ROMs can be maintained.

In step 527, an instruction to eject the optical disk 15 is issued to a disk inserting and ejecting system (not shown). The operation then returns to the main routine from the subroutine of the background formatting operation.

Meanwhile, if it is determined in step 505 that the formatting has been completed, the operation moves on to step 529. After the recording of the dummy data is completed, the recorded area is reproduced, and the recording quality of the dummy data is checked (a verify and check operation). If the recording quality does not satisfy predetermined conditions, information indicating that the recording area is a defective area is recorded in the MTA.

In step 529, "formatting completed" is recorded as the formatting condition information in the MTA.

In step 531, the contents of the MTA are duplicated, and the duplicated contents are stored in the STA. Since the formatting has been completed at this point, the STA is recorded in the outermost circumferential area in the data area DZA, as shown in FIG. 2A. The operation then returns to the main routine from the subroutine of the background formatting operation.

In step 409 in the flowchart of FIG. 4, after returning to the main routine from the subroutine of the background formatting operation, the MRW formatting operation comes to an end.

Figure 6:
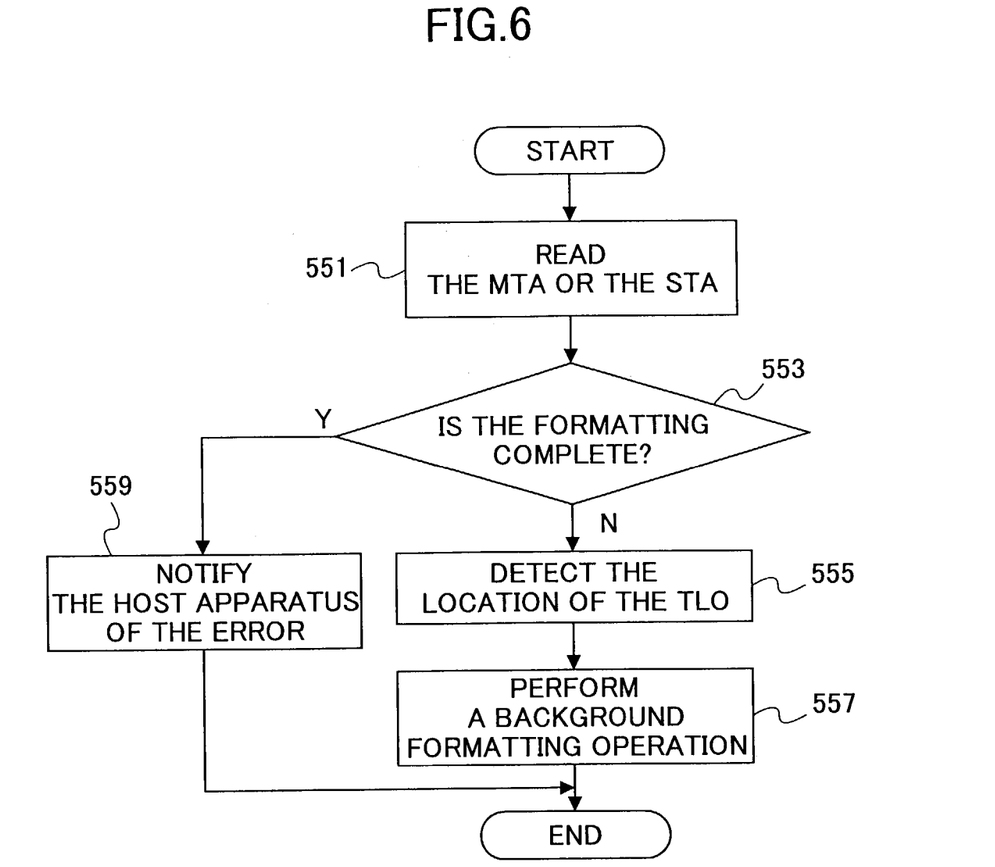
FIG. 6 is a flowchart of an operation performed in a case where an optical disk ejected from the-optical disk device of the present invention is reloaded into the optical disk device and receives a request for formatting in compliance with the DVD+MRW standard from the host apparatus.

Referring now to FIG. 6, an operation performed by the optical disk device 20 when the optical disk 15 ejected in the middle of the background formatting operation is reloaded into the optical disk device 20 and the MRW formatting command is issued from the host apparatus 50 will be described. The flowchart of FIG. 6 shows a series of processing algorithms performed by the CPU 40. When the MRW formatting command directed to an optical disk that is not a blank disk is issued from the host apparatus 50, the first address of the program corresponding to the flowchart of FIG. 6 is set in the program counter of the CPU 40, and thereby a reformatting operation starts.

In step 551, the information recorded in the MTA or the STA of the optical disk 15 is read and stored as MTA information in the RAM 41. The formatting condition information is then extracted from the MTA information.

In step 553, it is determined, from the extracted formatting condition information, whether the formatting has been completed. Since "formatting incomplete" has already been recorded as the formatting condition information, it is determined in step 553 that the formatting has not been completed, and the operation moves on to step 555.

In step 555, the location of the TLO is detected from the MTA information stored in the RAM 41, and is set as the start address of the formatting.

In step 557, a background formatting operation is performed in the same manner as in the above back ground formatting operation shown in FIG. 5. When the background formatting operation is completed, the reformatting operation comes to an end.

Meanwhile, if it is determined that the formatting has been completed in step 553, the operation moves on to step 559.

In step 559, error information to notify that the formatting has already been completed is sent to the host apparatus 50. The reformatting operation then comes to an end.

Next, the recording process performed by the optical disk device 20 will be described.

The CPU 40 outputs a control signal to the motor driver 27 to control the rotation of the spindle motor 22 based on a predetermined recording speed. The CPU 40 also notifies the reproduction signal processing circuit 28 that a recording requesting command has been received from the host apparatus 50. Further, the CPU 40 accumulates user data received from the host apparatus 50 in the buffer RAM 34 through the buffer manager 37.

When the rotational speed of the optical disk 15 reaches the predetermined linear speed, the reproduction signal processing circuit 28 detects a focusing error signal and a tracking error signal from an output signal from the light receiver of the optical pickup device 23, and outputs the focusing error signal and the tracking error signal to the servo controller 33. Based on the focusing error signal and the tracking error signal from the reproduction signals processing circuit 28, the servo controller 33 drives the focusing actuator and the tracking actuator of the optical pickup device 23 through the motor driver 27, so as to correct focus deviation and tracking deviation. The reproduction signal processing circuit 28 also obtains the ADIP information from the output signal from the light receiver of the optical pickup device 23, and transfers the ADIP information to the CPU 40.

Based on the defect control information recorded in the MTA, the CPU 40 determines whether the designated write area includes a defective area. If the designated write area includes a defective area, the CPU 40 uses a corresponding spare area as a write area, instead of the defective area. Based on the ADIP information, the CPU 40 outputs a signal to the motor driver 27 to control the seek motor of the optical pickup device 23, so that the optical pickup device 23 is positioned at the write start point.

Upon receipt of a notification from the buffer manager 37 that the amount of data accumulated in the buffer RAM 34 has exceeded a predetermined amount, the CPU 40 instructs the encoder 25 to produce write data. If the CPU 40 determines that the optical pickup device 23 is located at the write start point based on the ADIP information, the CPU 40 notifies the encoder 25 that recording can be started. The encoder 25 then records the write data on the optical disk 15 through the laser control circuit 24 and the optical pickup device 23.

After the recording of the write data is completed, the CPU 40 reproduces (reads) the area in which the write data have been recorded, and checks the recording quality of the write data (a verify and check operation). If the recording quality does not satisfy the predetermined conditions, information indicating that the recording area is a defective area is recorded in the MTA, and the write data recorded in the recording area are recorded in the corresponding spare area.

Next, the reproduction process performed by the optical disk device 20 will be described.

The CPU 40 outputs a control signal to-the motor driver 27 to control the rotation of the spindle motor 22 based on a predetermined reproduction speed. The CPU 40 also notifies the reproduction signal processing circuit 28 that a reproduction requesting command h as been received.

As in the case of the recording process, the reproduction signal processing circuit 28 sends the ADIP information to the CPU 40, and corrects focusing deviation and tracking deviation.

Based on the defect control information recorded in the MTA, the CPU 40 determines whether the designated read area includes a defective area. If the designated read area includes a defective area, the CPU 40 uses a corresponding spare area as a read area, instead of the defective area. The CPU 40 then outputs a signal to the motor driver 27 to control the seek motor of the optical pickup device 23, so that the optical pickup device 23 is positioned to the read start point based on the ADIP information. If the CPU 40 determines that the optical pickup device 23 is located at the read start point based on the ADIP information, the CPU 40 notifies the reproduction signal processing circuit 28 that the reproduction can be started.

The reproduction signal processing circuit 28 then detects a RF signal from an output signal from the optical pickup device 23. After performing error correction and the like on the RF signal, the reproduction signal processing circuit 28 stores the RF signal in the buffer RAM 34.

When the reproduction data accumulated in the buffer 34 are a complete sector of data, the buffer manager 37 transfers the reproduction data to the host apparatus 50 via the interface 38.

In either case of recording and reproducing, the reproduction signal processing circuit 28 keeps detecting a focusing error signal and a tracking error signal from an output signal from the light receiver of the optical pickup device 23, and, if necessary, corrects focusing deviation and tracking deviation through the servo controller 33 and the motor driver 27, until the recording process or the reproduction process is completed.

In the following, a case where the optical disk 15 that has been subjected to the above MRW formatting is loaded into an optical disk device (not shown) that does not support the DVD+MRW standard (hereinafter referred to as the "conventional disk device", for ease of explanation) will be described. This conventional disk device supports the DVD+RW standard. Also, the MRW driver is not incorporated into the host apparatus (not shown) that controls the conventional disk device.

Figure 7:
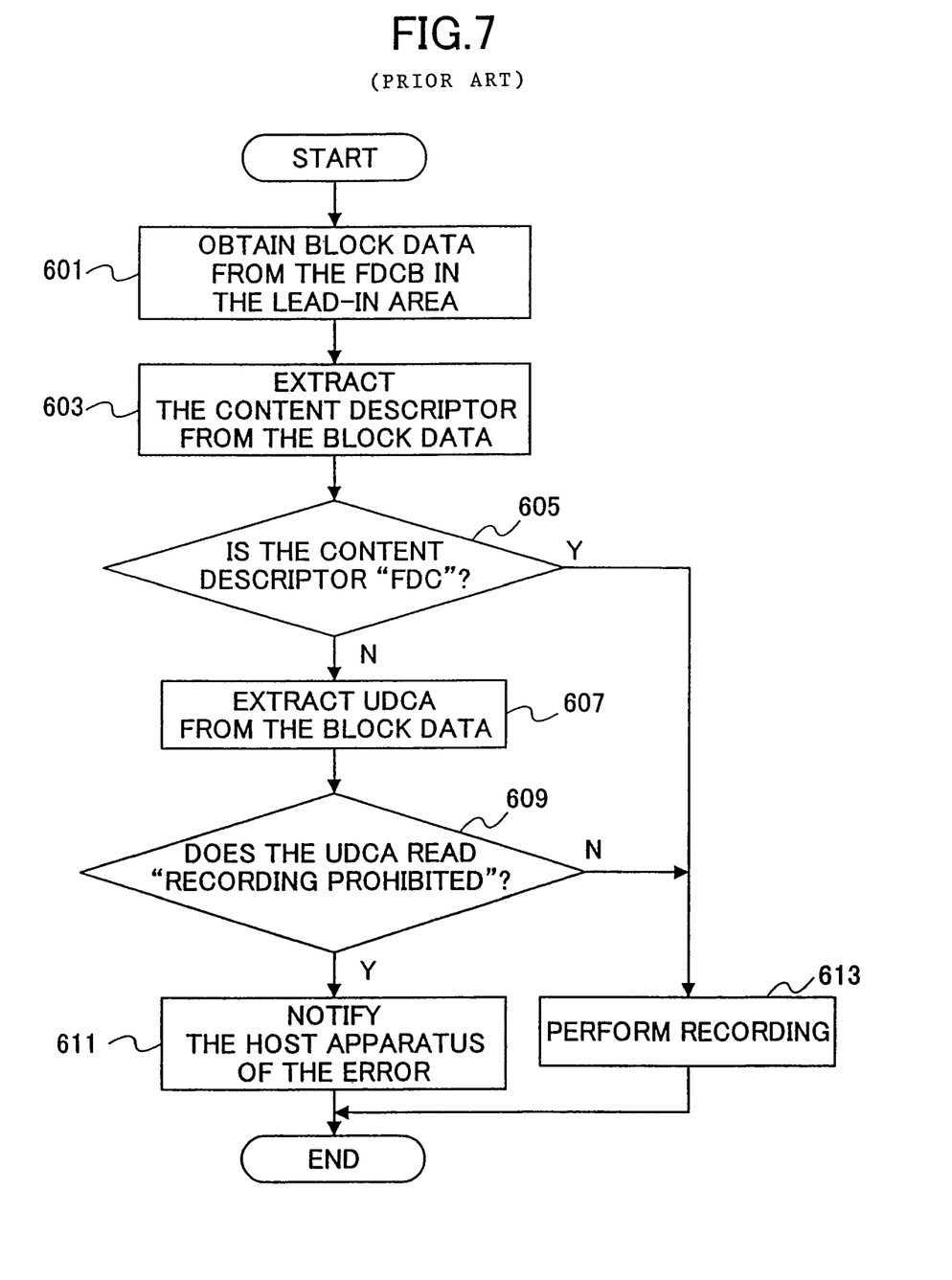
FIG. 7 is a flowchart of an operation performed by a conventional disk device that has received a request for user data recording from the host apparatus.

Referring to FIG. 7, an operation performed when the conventional disk device receives a request for user data recording on the optical disk 15 from the host apparatus will be described. This operation will be hereinafter referred to as the "recording request receiving operation". The flowchart of FIG. 7 shows a series of processing algorithms performed by the CPU (not shown) of the conventional disk device.

In step 601, block data are read from the FDCB in the lead-in area LIA on the optical disk 15.

In step 603, the content descriptor is extracted from the read block data.

In step 605, it is determined whether the extracted content descriptor indicates "FDC". Since the content descriptor indicates "MRW" here, the result of the determination in step 605 is "NO", and the operation moves on to step 607.

In step 607, since the "MRW" is not a supported content descriptor, the read block data are determined to be unrecognizable block data, and the UDCA is extracted from the read block data.

In step 609, it is determined whether data recording is prohibited based on the extracted UDCA. Since data recording is prohibited here, the result of the determination in step 609 is "YES", and the operation moves on to step 611.

In step 611, error information indicating that data recording is prohibited is sent to the host apparatus, and the recording request receiving operation comes to an end, without-recording user data.

In a case where an optical disk other than the optical disk 15 is loaded into the conventional disk device, if it is determined in step 609 that data recording is not prohibited, the operation moves on to step 613. In step 613, user data recording is carried out. After the user data recording is completed, the recording request receiving operation comes to an end. Meanwhile, if it is determined in step 605 that the extracted content descriptor indicates "FDC", the operation moves on to step 613, in which user data recording is carried out.

Figure 8:
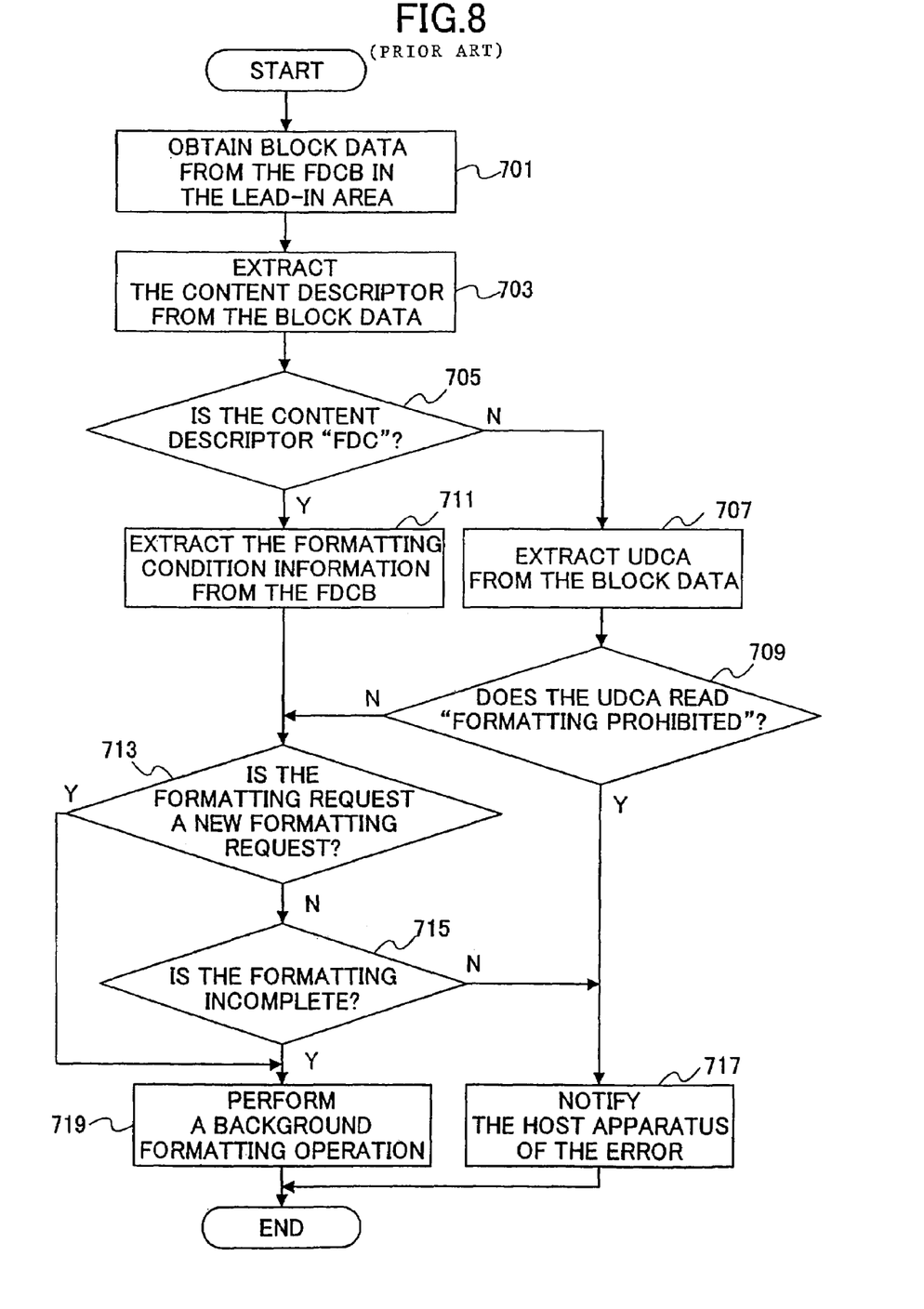
FIG. 8 is a flowchart of an operation performed by the conventional disk device that has received a formatting request from the host apparatus.

Referring now to FIG. 8, an operation performed when the conventional disk device receives a formatting request from the host apparatus will be described. This operation will be hereinafter referred to as the "formatting request receiving operation". The flowchart of FIG. 8 shows a series of processing algorithms performed by the CPU (not shown) of the conventional disk device.

In step 701, block data are read from the FDCB area in the lead-in area LIA on the optical disk 15.

In step 703, the content descriptor is extracted from the read block data.

In step 705, it is determined whether the extracted content descriptor indicates "FDC". Since the content descriptor indicates "MRW" here, the result of the determination in step 705 is "NO", and the operation moves on to step 707.

In step 707, since the "MRW" is not a supported content descriptor, the read block data are determined to be unrecognizable block data, and the UDCA is extracted from the read block data.

In step 709, it is determined whether formatting is prohibited, based on the extracted UDCA. Since formatting is permitted here, the result of the determination in step 709 is "NO", and the operation moves on to step 713.

In step 713, it is determined whether the formatting request from the host apparatus is a new formatting request. If the formatting request from the host apparatus is not a new formatting request, the operation moves on to step 715.

In step 715, it is determined whether the formatting is in progress, based on the formatting condition information. Since the FDCB is unrecognizable here, the formatting condition information cannot be obtained. Accordingly, the result of the determination in step 715 is "NO", and the operation moves on to step 717.

In step 717, error information indicating that formatting cannot be performed is sent to the host apparatus, and the formatting request receiving operation comes to an end, without performing a formatting operation.

Meanwhile, if it is determined in step 713 that the formatting request from the host apparatus is a new formatting request, the result of the determination in step 713 is "YES", and the operation moves on to step 719.

In step 719, a background formatting operation in compliance with the DVD+RW standard is performed. By doing so, the MTA area in the lead-in area LIA is cleared, and block data having the content descriptor of "FDC" are recorded in the FDCB area. Appropriate formatting condition information and the like are then recorded in the content descriptor specifics. As a result, the optical disk 15 becomes an information recording medium that is compliant with the DVD+RW standard, and the user data previously recorded in the optical disk 15 are erased. When the background formatting operation is completed, the formatting request receiving operation comes to an end as well.

In a case where an optical disk other than the optical disk 15 is loaded into the conventional disk device, if it is determined in step 709 that formatting is prohibited, the operation moves on to step 717. Meanwhile, if it is determined in step 705 that the extracted content descriptor indicates "FDC", the operation moves on to step 711. In step 711, the formatting condition information is extracted from the FDCB. If the formatting is in progress, the result of the determination in step 715 is "YES", and the operation moves on to step 719.

As is apparent from the above explanation, the optical disk device described above embodies the communication controller, the restriction information recorder, and the completion information recorder of an information recording device, by virtue of the CPU 40 and the program executed by the CPU 40. However, the present invention is not limited to the above embodiment, which is merely an example. At least a part of the means realized through the operation in accordance with the program executed by the CPU 40 may be formed by-hardware, or all of the means may be formed by hardware.

Also, the restriction information recording program is embodied through the program corresponding to the operation shown by the flowchart of FIG. 4 among the programs installed in the ROM 39.

Further, the step of recording restriction information in accordance with the present invention is carried out through the procedures of steps 401, 403, and 407 in the flowchart of FIG. 4. The step of recording formatting information in accordance with the present invention is carried out through the procedures of steps 405 and 407 in the flowchart of FIG. 4.

As described above, with the optical disk device of the present invention, block data having "MRW" set in the content descriptor and "data recording prohibited" set in the UCDA are recorded in the FDCB area on the optical disk 15. With this structure, even if a request for user data recording is transmitted from the host apparatus to a conventional disk device into which the optical disk 15 is loaded, user data recording in a defective area is prevented, as user data recording is prohibited. Accordingly, the contents of the defect control information cannot be modified nor depart from the actual defects. Thus, information recorded in a recording format compliant with the DVD+MRW standard can be protected.

Also, with the optical disk devices of the present invention, block data having "MRW" set in the content descriptor are recorded in the FDCB area on the optical disk 15. Accordingly, a conventional disk device into which the optical disk 15 is loaded cannot recognize the formatting condition information. As a result, even if a request for formatting is transmitted from the host apparatus, resumption of the formatting is prohibited. Thus, overwrite of the defect control information by dummy data can be prevented.

Further, with the optical disk device of the present invention, block data having "MRW" set in the content descriptor and "formatting permitted" set in the UCDA are recorded in the FDCB area on the optical disk 15. When a request for reformatting is transmitted from the host apparatus to a conventional disk device into which the optical disk 15 is loaded, reformatting is performed, and the optical disk 15 can be changed into an optical disk that is compliant with the DVD+RW standard.

Also, in the optical disk of the present invention, restriction information for restricting recording in a recording format compliant with the DVD+RW is recorded in the FDCB area by the optical disk device 20. Accordingly, data already recorded in a recording format compliant with the DVD+MRW standard can be protected.

Although the ASCII codes of "MRW" are set in the content descriptor in the block data recorded in the FDCB area in the above embodiment, any ID information that is not supported by conventional disk devices may be set in the content descriptor.

Also, in the above embodiment, "formatting completed" is recorded as the formatting condition information in the content descriptor specifics in the block data recorded in the FDCB area. However, in a case where the content descriptor is always checked (step 705 of FIG. 8) in a conventional disk device, it is not necessary to record the "formatting completed". In other words, the procedure of step 405 of FIG. 4 can be omitted. In this case, if the content descriptor is not "FDC", the conventional disk device cannot detect the formatting condition information, and accordingly, the result of the determination in step 715 of FIG. 8 becomes invariably "NO".

Although the restriction information recording program is recorded in the ROM 39 in the optical disk device of the above embodiment, it may be recorded on an information recording medium of some other type, such as a CD-ROM, a magneto-optical disk, a flash memory, or a flexible disk. In this case, a suitable drive device is provided to the information recording medium, and the restriction information recording program is installed through the drive device. The objective here is to load the restriction information recording program in the main memory of the CPU 40.

Also, the optical disk 15 has been described as a DVD in the above embodiment. However, the optical disk 15 is not necessarily a DVD, but may be a CD.

Further, in the above embodiment, "data recording prohibited" and "formatting permitted" are set as the restriction information in the part of the RAM data area corresponding to the UDCA in the FDCB (step 403 of FIG. 4). However, the setting is not limited to this, and "formatting prohibited" may be set in the RAM data area in a case where new formatting is also prohibited.

It should be noted that the present invention is not limited to the embodiments specifically disclosed above, but other variations and modifications may be made without departing from the scope of the present invention.

The present application is based on Japanese priority application No. 2002-160422 filed on May 31, 2002 with the Japanese Patent Office, the entire contents of which are hereby incorporated by reference.

What is claimed is:

1. A method of recording information on a recording medium, comprising the steps of:
   recording restriction information for restricting recording in one or more recording formats other than a designated recording format among a plurality of recording formats applicable to the recording medium, in response to a request for recording in the designated recording format among the plurality of recording formats, the restriction information being recorded in a predetermined area on the recording medium; and
   recording formatting information that indicates completion of formatting, regardless of how much progress has been made in the formatting, the step of recording the formatting information being carried out after the step of recording the restriction information.

2. The method as claimed in claim 1, wherein the designated recording format is a recording format that is compatible with the one or more recording formats in which recording is restricted.

3. The method as claimed in claim 1, wherein the designated recording format is a recording format formed by adding a function of controlling information as to defects in the recording medium to one of the one or more recording formats in which recording is restricted.

4. The method as claimed in claim 1, wherein:
   the designated recording format is a recording format compliant with the DVD+RW Mt. Rainier standard; and
   the one or more recording formats in which recording is restricted include a recording format compliant with the DVD+RW standard.

5. The method as claimed in claim 4, wherein the predetermined area is an area of a formatting disk control block.

6. The method as claimed in claim 5, wherein:
   the formatting disk control block includes a content descriptor and unknown content descriptor actions; and
   the step of recording the restriction information includes:
      recording ID information in the content descriptor, the ID information being other than ID information indicating the formatting disk control block; and recording information for restricting data recording in the unknown content descriptor actions.

7. The method as claimed in claim 6, wherein the information for restricting data recording is information for entirely prohibiting data recording.

8. The method as claimed in claim 6, wherein the information for restricting data recording is information for prohibiting any data recording operations other than a formatting operation.

9. The method as claimed in claim 1, wherein the step of recording the formatting information includes recording the formatting information in an area of a formatting disk control block on the recording medium.

10. A recording medium on which restriction information is recorded by a recording method comprising the steps of:
   recording restriction information for restricting recording in one or more recording formats other than a designated recording format among a plurality of recording formats applicable to the recording medium, in response to a request for recording in the designated recording format among the plurality of recording formats, the restriction information being recorded in a predetermined area on the recording medium; and
   recording formatting information that indicates completion of formatting, regardless of how much progress has been made in the formatting, the step of recording the formatting information being carried out after the step of recording the restriction information.

11. A computer-readable medium containing a program that is utilized in an information recording device that records information on a recording medium, the program being executed by a computer for controlling the information recording device, and the computer carrying out the steps of:
   recording restriction information for restricting recording in one or more recording formats other than a designated recording format among a plurality of recording formats applicable to the recording medium, in response to a request from the outside, the restriction information being recorded in a predetermined area on the recording medium; and
   recording completion information that indicates completion of formatting, regardless of how much progress has been made in the formatting, the step of recording the completion information being carried out after the step of recording the restriction information.

12. The computer-readable medium as claimed in claim 11, wherein the designated recording format is a recording format compliant with the DVD+RW Mt. Rainier standard.

13. The computer-readable medium as claimed in claim 12, wherein the predetermined area is an area of a formatting disk control block.

14. The computer-readable medium as claimed in claim 13, wherein:
   the formatting disk control block includes a content descriptor and unknown content descriptor actions; and
   the step of recording the restriction information includes:
      recording ID information in the content descriptor, the ID information being other than ID information indicating the formatting disk control block; and
      recording information for restricting data recording in the unknown-content descriptor actions.

15. The computer-readable medium as claimed in claim 14, wherein the information for restricting data recording is information for entirely prohibiting data recording.

16. The computer-readable medium as claimed in claim 14, wherein the information for restricting data recording is information for prohibiting any data recording operations other than a formatting operation.

17. A computer-readable information recording medium on which a program to be utilized in an information recording device that records information on a recording medium is recorded, the program being executed by a computer for controlling the information recording device, and the computer carrying out the steps of:
   recording restriction information for restricting recording in one or more recording formats other than a designated recording format among a plurality of recording formats applicable to the recording medium, in response to a request from the outside, the restriction information being recorded in a predetermined area on the recording medium; and
   recording completion information that indicates completion of formatting, regardless of how much progress has been made in the formatting, the step of recording the completion information being carried out after the step of recording the restriction information.

18. An information recording device that records information on a recording medium, comprising:
   a communication controller that controls communication with an external device;
   a restriction information recorder that records restriction information for restricting recording in one or more recording formats other than a designated recording format among a plurality of recording formats applicable to the recording medium, in response to a request for formatting in the designated recording format from the external device via the communication controller, the restriction information being recorded in a predetermined area on the recording medium; and
   a completion information recorder that records completion information indicating completion of formatting, regardless of how much progress has been made in the formatting, the completion information being recorded after the recording of the restriction information by the restriction information recorder is completed.

19. The information recording device as claimed in claim 18, wherein the designated recording format is a recording format compatible with the one or more recording formats in which recording is restricted.

20. The information recording device as claimed in claim 18, wherein the designated recording format is a recording format formed by adding a function of controlling information as to defects in the recording medium to one of the one or more recording formats in which recording is restricted.

21. The information recording device as claimed in claim 18, wherein:
   the designated recording format is compliant with the DVD+RW Mt. Rainier standard; and
   the one or more recording formats in which recording is restricted include a recording format compliant with the DVD+RW standard.

22. The information recording device as claimed in claim 21, wherein the predetermined area is an area of a formatting disk control block.

23. The information recording device as claimed in claim 22, wherein:
   the formatting disk control block includes a content descriptor and unknown content descriptor actions; and
   the restriction information recorder records ID information in the content descriptor, the ID information being other than ID information indicating the formatting disk control block, and also records information for restricting data recording in the unknown content descriptor actions.

24. The information recording device as claimed in claim 23, wherein the information for restricting data recording is information for entirely prohibiting data recording.

25. The information recording device as claimed in claim 23, wherein the information for restricting data recording is information for prohibiting any data ecording operations other than a formatting operation.

* * * * *